(12) United States Patent
Grover

(10) Patent No.: US 8,684,632 B2
(45) Date of Patent: Apr. 1, 2014

(54) SYSTEMS AND METHODS FOR LAYING OUT AND INSTALLING A SOLAR PANEL ARRAY

(75) Inventor: Rick Grover, Haleiwa, HI (US)

(73) Assignee: LaserLine Mfg., Inc., Redmond, OR (US)

( * ) Notice: Subject to any disclaimer, the term of this patent is extended or adjusted under 35 U.S.C. 154(b) by 145 days.

(21) Appl. No.: 13/187,707

(22) Filed: Jul. 21, 2011

(65) Prior Publication Data

US 2012/0148349 A1    Jun. 14, 2012

Related U.S. Application Data

(60) Provisional application No. 61/421,102, filed on Dec. 8, 2010.

(51) Int. Cl.
*E02D 11/00*    (2006.01)

(52) U.S. Cl.
USPC .......................................................... 405/232

(58) Field of Classification Search
CPC ...................................................... E02D 11/00
USPC ................................................. 405/231, 232
See application file for complete search history.

(56) References Cited

U.S. PATENT DOCUMENTS

| | | | |
|---|---|---|---|
| 4,251,819 A * | 2/1981 | Vickland | ........................ 343/882 |
| 4,751,382 A | 6/1988 | Reifel et al. | |
| 4,907,915 A | 3/1990 | Nicholson et al. | |
| 5,287,627 A | 2/1994 | Rando | |
| 5,548,397 A | 8/1996 | Kool et al. | |
| 7,042,555 B1 | 5/2006 | Lawson | |
| 7,215,420 B2 | 5/2007 | Gellerman et al. | |
| 2003/0101606 A1 | 6/2003 | Li | |
| 2003/0137658 A1 | 7/2003 | Ohtomo et al. | |
| 2010/0092247 A1 | 4/2010 | Hecht et al. | |

OTHER PUBLICATIONS geo-Fennel, "Laser measufing tools and surverying equipment", catalog [online], Dec. 2008 [retrieved on Mar. 29, 2012)]. Retrieved from the Internet<URL:http://www.thifab.com/Katalog_2008_e_07_01_09.pdf>p. 30, 31,40.

International Searching Authority, Notification of Transmittal of the International Search Report and the Written Opinion of the International Searching Authority for International Application No. PCT/US11/63389.

* cited by examiner

*Primary Examiner* — David J. Bagnell
*Assistant Examiner* — Kyle Armstrong
(74) *Attorney, Agent, or Firm* — Perkins Coie LLP

(57) ABSTRACT

A system for installing an array of pilings for an array of solar panels is highly accurate and efficient. The system includes a horizontal laser and a rotating vertical laser that are mounted on a first piling and aligned with a target on a second piling on the opposite side of the array. An alignment template is placed against a piling and aligned with the vertical rotating laser. The aligned template provides a designated location where the next piling is driven. A hammer target on the pile driver allows the installer to precisely install the next piling. After installation, the next piling is measured for accuracy and if errors are found, an alignment bracket is used to correct the error. The process is repeated until the array of pilings is complete.

27 Claims, 13 Drawing Sheets

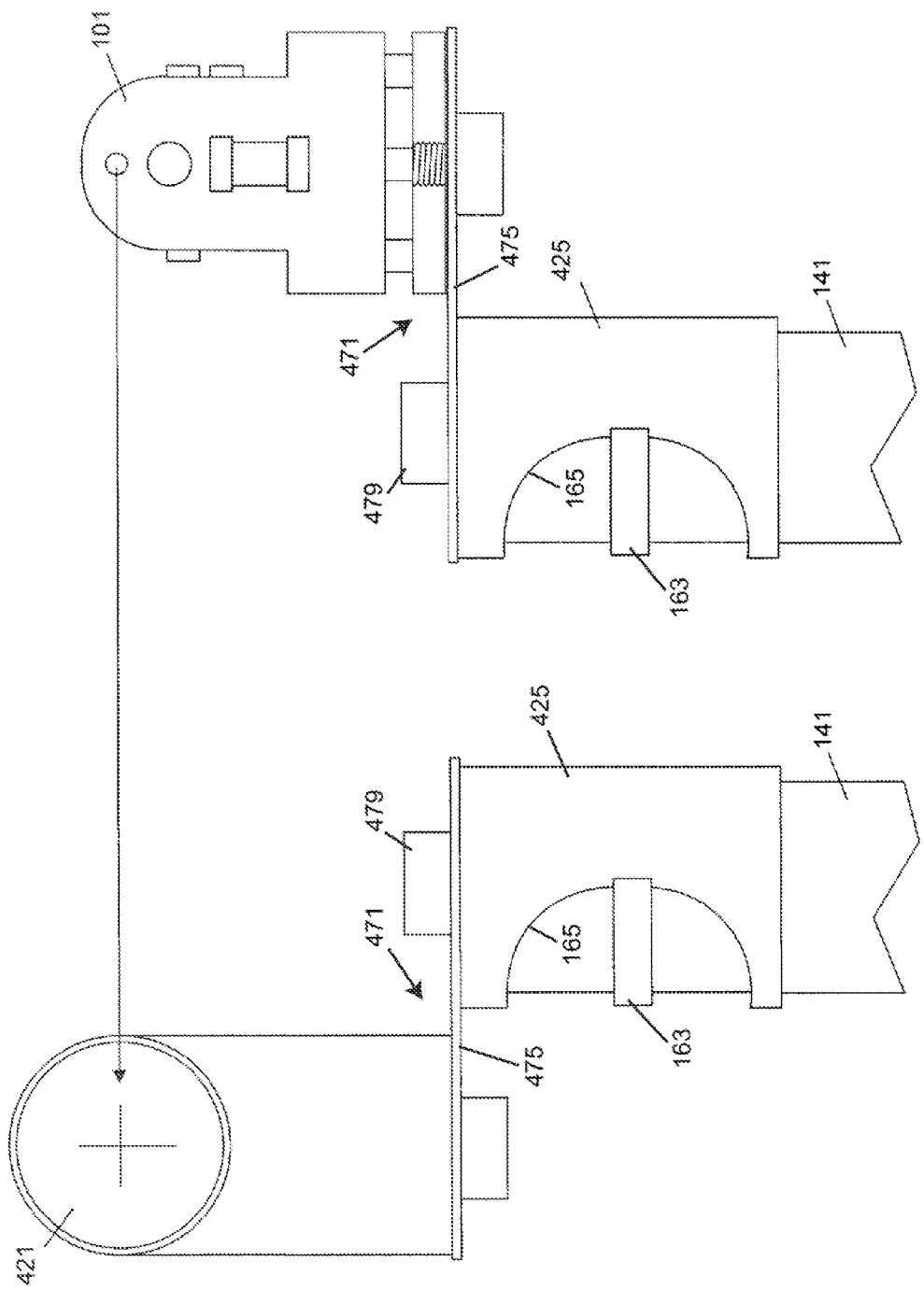

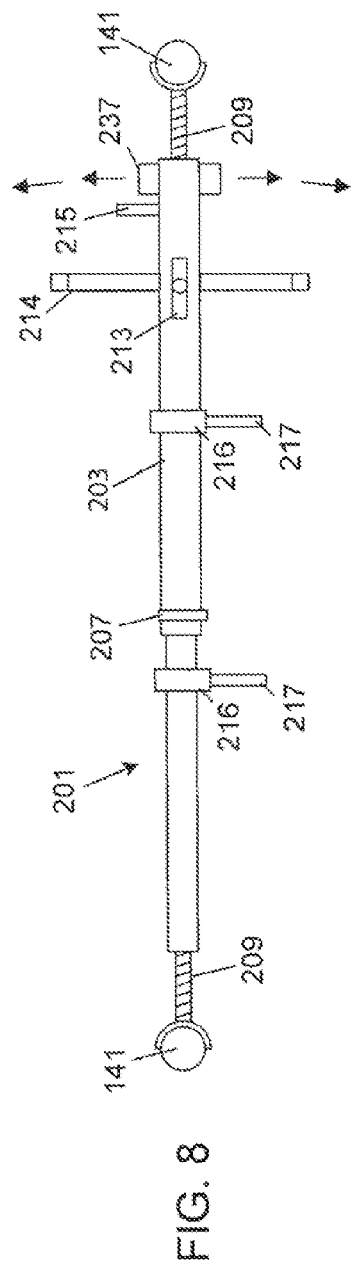
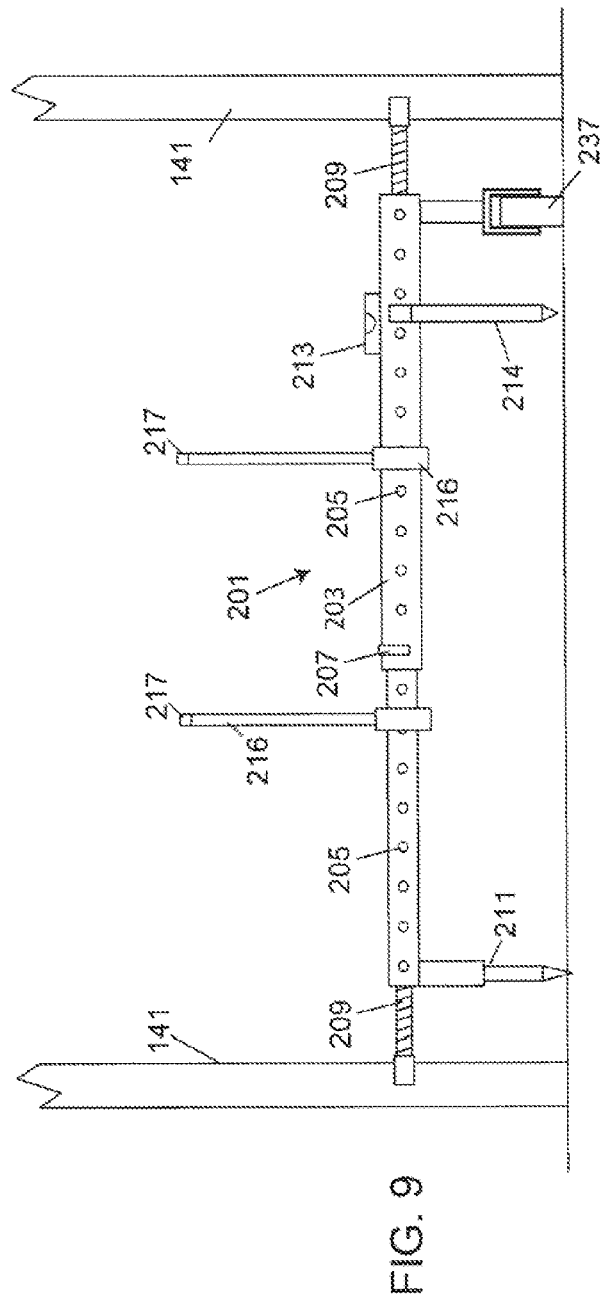
FIG. 8
FIG. 9

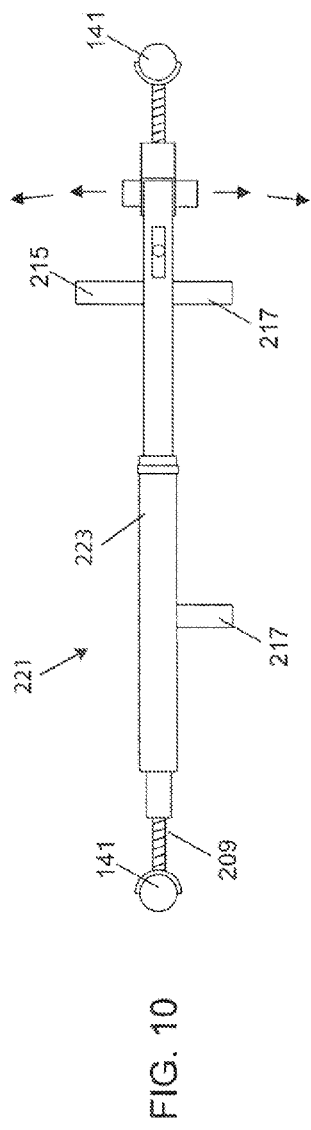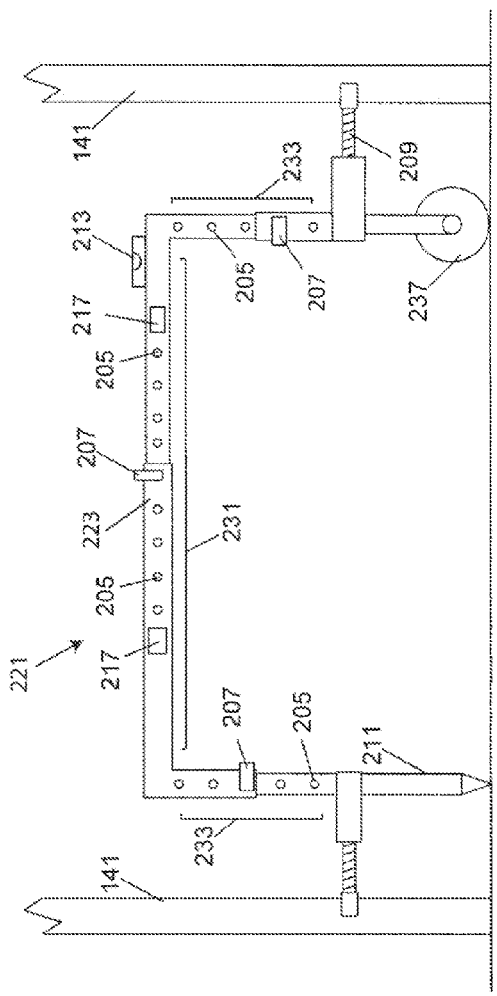

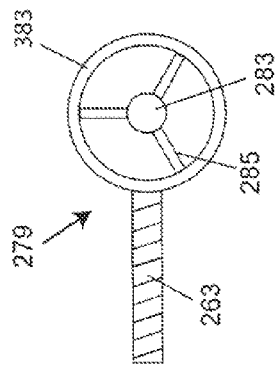
FIG. 16
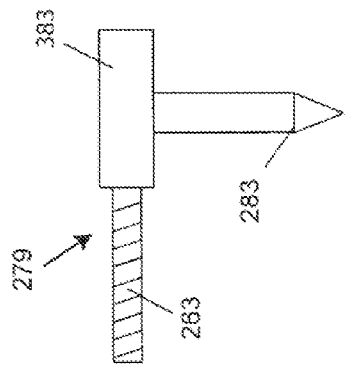
FIG. 17
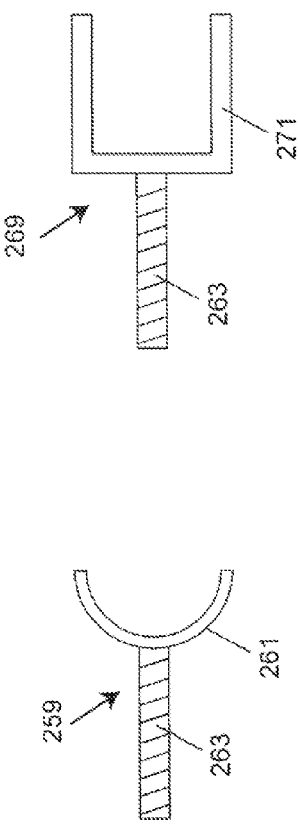
FIG. 14
FIG. 12
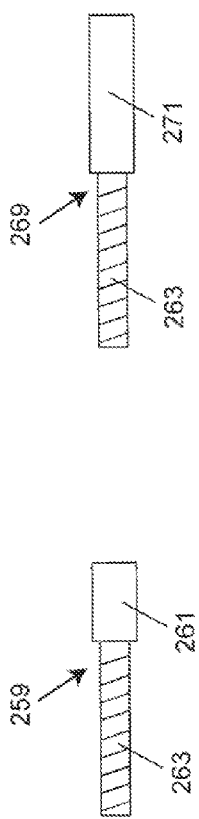
FIG. 15
FIG. 13

SYSTEMS AND METHODS FOR LAYING OUT AND INSTALLING A SOLAR PANEL ARRAY

CROSS REFERENCE TO RELATED APPLICATION

This application claims priority to U.S. Provisional Patent Application No. 61/421,102, "Systems And Methods For Laying Out And Installing A Solar Array" filed Dec. 8, 2010. U.S. Provisional Patent Application No. 61/421,102 is hereby incorporated by reference.

BACKGROUND

A solar panel is a packaged interconnected assembly of solar cells, also known as photovoltaic cells. The solar panel can be used as a component of a larger photovoltaic system to generate and supply electricity in commercial and residential applications. The power that one solar panel can produce is seldom enough to meet requirements of a home or a business, so the solar panels are linked together to form a solar panel array. Most solar panel arrays use an inverter to convert the DC power produced by the modules into alternating current that can power lights, motors, and other loads. The solar panels in a solar panel array can be connected in series to obtain the desired voltage and then the series coupled groups of panels can be connected in parallel to allow the system to produce more current.

For optimum efficiency, the solar panels should be in perpendicular alignment with the light rays of the sun. However, since the earth is constantly rotating, a fixed solar panel may be oriented to be perpendicular to the sun light at approximately noon each day. Each solar panel in the solar panel array can be attached to a fixed mount that tilts the solar panel to face due South in the Northern Hemisphere and conversely, the fixed mount can tilt the solar panel to face due North in the Southern Hemisphere. The tilt angle can be varied for season, but if fixed, should be set to give optimal array output during the peak electrical demand portion of a typical year.

In order to improve efficiency, some solar panel arrays can track the movement of the sun through each day to greatly enhance energy collection. These tracking systems may move periodically to optimize the tilt angle so that in the morning the solar panel can face East and in the afternoon, the solar panel can face West. Solar panel tracking devices add cost, and require maintenance, but can also significantly improve the efficiency of the solar panel array. For large solar panel arrays, the energy gained by using tracking systems outweighs the added complexity and can increase efficiency by 30% or more compared to fixed systems.

Solar panel electrical output is extremely sensitive to shading. When even a small portion of a solar panel or solar panel array is shaded, while the remainder is in sunlight, the output falls dramatically due to internal "short-circuiting" which results from the electrons reversing course through the shaded portion of the p-n junction. If the current drawn from the series string of solar cells in the solar panel is no greater than the current that can be produced by the shaded cell, the current and power developed by the string is limited. If enough voltage is available from the rest of the cells in a string, current will be forced through the cell by breaking down the junction in the shaded portion. Thus, instead of adding to the power produced by the solar panel, the shaded cell(s) in the solar panel absorbs power, turning it into heat. Since the reverse voltage of a shaded cell is much greater than the forward voltage of an illuminated cell, one shaded cell can absorb the power of many other cells in the string, disproportionately affecting panel output. For example, a shaded cell may drop 8 volts, instead of adding 0.5 volts, at a particular current level, thereby absorbing the power produced by 16 other cells. Therefore, it is extremely important that in a solar panel array installation none of the panels is shaded at all by an adjacent solar panel.

It is desirable to have the solar panel array occupy a minimum amount of land. However, for the reasons discussed above, each solar panel must not cast a shadow on any portion of the adjacent solar panels in order to prevent the short-circuiting described above. Each of the solar panels in the solar panel array is mounted to a piling that is driven into the ground and provides a stable support structure for the solar panel. Thus, the positions of the pilings determine the positions of the solar panels in the array of panels. Because the positions of the panels are critical for space and operating efficiency each piling must be precisely positioned. A typical array can include 980 to 1,250 foundation pile.

In order to position each piling accurately, a survey crew which can typically include two workers are required to determine the exact location of each piling. After the piling locations are determined, a plate lay-out crew may be required to place guild plates over each piling location. The plate lay-out crew may require four workers who position and then stake each guild plate in place at each piling location of the solar panel array. The staking of the plate can require a significant amount of force to swing a sledge hammer to drive the stakes in place and can result in hand injuries. An alignment crew may also be necessary to adjust the alignment of the pilings. After they are driven.

The typical foundation of a solar panel array system consists of 12' to 20' long piles which can be pipe with a circular cross section, I-beam or other cross sections that can be driven into the ground using a pile driver. Driving piles, as opposed to drilling shafts, is advantageous because the soil displaced by driving the piles compresses the surrounding soil, causing greater friction against the sides of the piles, thus increasing their load-bearing capacity. A solar panel can be mounted on each of the driven piles. A solar array system can have about 1,000 piles per mega watt. There are other techniques for producing the solar panel array foundations, but a driven pile is more cost efficient verses other techniques like poured in place concrete and concrete ballast system which can be about ten times more expensive.

One method the piles can be aligned in an array using stringing lines tape measures. The laser can mark a straight line that the pilings can be aligned with. Once the laser is used to identify a point, a string line is pulled to create a reference line that should be straight along the laser line. The string line can be stretched across a portion of the solar array land to create a reference line for aligning the pilings. However, a problem with string lines is they move in the wind even while under tension. A cross wind can cause the string line to curve and when pulling a string line over 100 feet, the line may not be straight. All solar arrays, the pilings have to be within ¼ inch of side to side alignment and within ¼ inch of the designated height. Setting the pilings with the string lines and tape may not be able to provide the required level of accuracy.

Another method for properly positioning each piling is surveying every piling point for a solar panel array. After each survey, each piling point is marked with a nail and ribbon. The ground crew then installs the guide plates at each piling point. The surveying and guide plate installation are not only costly but time consuming as well. In some installations, rain or snow can occur after the survey making it impossible to keep working because the survey points are under water or snow.

After the guide plates have been set, an ABI crew installs the piles. What is needed is an improved system for installing the piles for a solar panel array that is more accurate and efficient.

BRIEF DESCRIPTION

The present invention is directed towards an improved method for accurately and quickly installing pilings in a solar panel array. A solar panel array can be rectangular in shape with four corners. Rather than surveying each piling location, only the corner locations can be surveyed and pilings can be installed at each corner. Each corner piling can be aligned vertically and be at a precise height. Once the corner pilings have been installed, a system can be used to install the remaining pilings in the solar panel array. The system can comprise a true site laser, a guide template, a pile driver that includes a hammer target, an aligning bracket and a hand held receiving target. The true site laser can include a sight scope, a horizontal laser, a rotation vertical laser and a battery pack. The guide template can include ends having fittings that correspond in shape to the piling cross section, a level sensor, a laser receiver, an adjustable pivot point and an adjustable wheel. The guide template can be adjustable in length and height.

In order to set the pilings, the true site laser can be mounted on a corner piling in alignment with an adjacent corner piling. The guide template is set to the proper length and one end of the guide template can be placed against the corner piling. The guide template is leveled and rotated about the corner piling into alignment with the rotating vertical laser of the true sight laser. Once aligned and leveled, the opposite end of the guide template indicates the position of the aligned adjacent piling. An ABI pile driver having a hammer target can be used to drive the new pile into the ground. The hammer target can be mounted on a high strength bracket that can withstand the forces of the ABI hammer. As the pile is driven into the ground, the hammer target will move in front of the horizontal laser which can appear as a visible dot on the hammer target. The pile driver can insert the pile until the laser dot on the target is vertically and horizontally aligned with the bull's eye of the target.

The pile driver may not be able to make horizontal adjustments to the pile and horizontal movement of the pile can occur for various reasons. For example, a pile may contact a solid object(s) such as a rock that can cause horizontal deflection of the pile during the driving process. After the pile is driven into the ground to the proper height, a hand held target can be placed on the pile for alignment inspection. If the pile is properly aligned, the described process can be repeated for the next piling. However, if there is a horizontal error, the piling will need to be adjusted. In order to correct this alignment error, the aligning bracket can be placed over the piling and a horizontal force can be applied to the aligning bracket. The force applied to the aligning bracket can cause the piling to move into alignment. Adjustments can be made until the piling is within the required horizontal alignment tolerance. Once the piling has been installed and aligned, the guide template can be placed against the piling and aligned with the vertical laser to set the next piling in place. The described process can be repeated until all of the pilings in the row of the solar array have been installed.

In an embodiment, the perimeter pilings between the corner pilings can be installed first. After the perimeter has been completed, the rows of pilings can be installed sequentially. After each row is completed, the true sight laser assembly can be moved to the next row and the same process can be used to install the array of pilings is complete. By performing the described process, pilings in a 1,000+ piling array have been installed with an accuracy of ¼ inch of side to side alignment and within ¼ inch of the designated height.

BRIEF DESCRIPTION OF THE DRAWINGS

FIGS. 6-7 illustrate an embodiment of an offset mounting bracket for securing equipment to pilings;

FIGS. 8-11 illustrate embodiments of alignment templates;

FIGS. 12-17 illustrate embodiments of end fittings;

DETAILED DESCRIPTION

The present invention is directed towards a system and method for installing pilings which each support a solar panel which is part of a solar panel array. In an embodiment, the system used to install the solar array pilings includes: a true sight laser assembly, a hammer target, a receiving target, an adjustable guide template, and aligning bracket. These components are used to align, install and adjust the pilings for a solar panel array.

Figure 1:
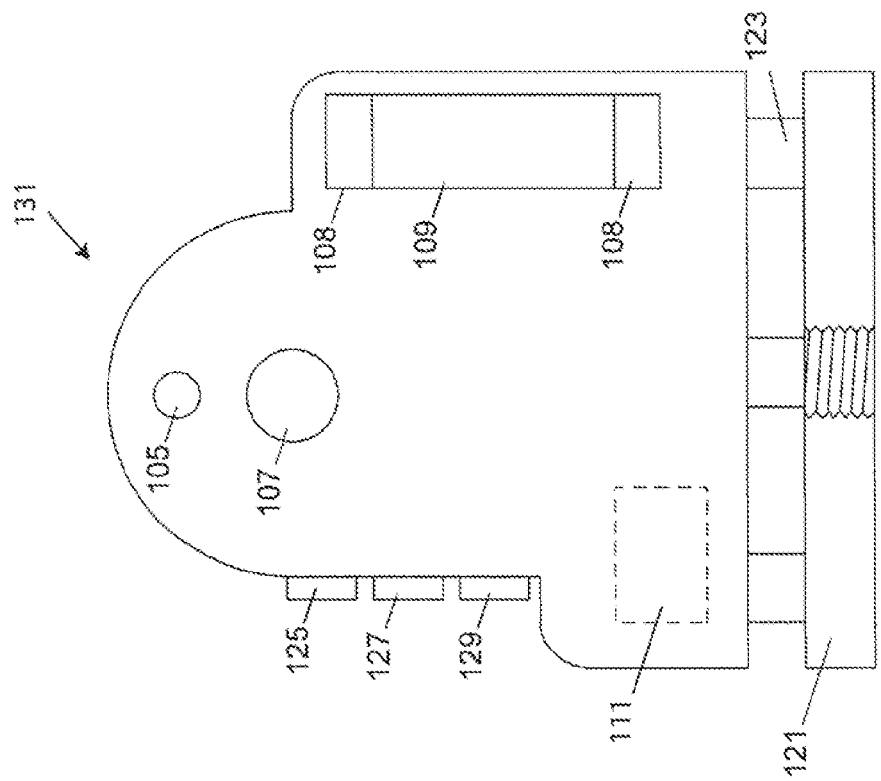
FIGS. 1-2 illustrate front views of embodiments of true sight lasers.

With reference to FIG. 1, a front view of a true sight laser assembly 101 is illustrated. In an embodiment, the true sight laser assembly 101 comprises: a laser 105 for emitting a laser beam, a sight scope 107 for a user to view the alignment of the true sight laser assembly 101, a vertical rotating laser 109 and a battery pack 111. The laser 105, sight scope 107 and vertical rotating laser 109 can be mounted in a housing that is attached to a base plate 121 by one or more adjustment connectors 123 that can be adjusted so that the base plate 121 is properly aligned with the laser 105, sight scope 107 and vertical rotating laser 109. In an embodiment, the adjustment connectors 123 are threaded rods that can be rotated to adjust the distance between the housing and the base plate 121. In an embodiment, a locking mechanism can hold the adjusting mechanisms 123 in place after they have been properly adjusted. In other embodiments, any other type of alignment adjustment mechanism can be used.

In this embodiment, the laser 105, sight scope 107 and vertical rotating laser 109 will all be in vertical alignment with each other and all can have controls for fine tune adjustment. For example, the true sight laser assembly 101 can also have several fine tune adjustments controls including: a sight scope adjustment 125 for focusing the sight scope 107, a horizontal sight scope adjustment 127 for adjusting the side to side alignment and a vertical sight scope adjustment 129 for adjusting the up and down alignment. The sight scope adjustment 125, horizontal sight scope adjustment 127 and vertical sight scope adjustment 129 can be finger controls that allow a user to control the adjustments by hand. In an embodiment, the system may include locking mechanisms to prevent the sight scope adjustment 125, horizontal sight scope adjustment 127 and vertical sight scope adjustment 129 settings from being changed after they have been properly adjusted.

The rotating vertical laser 109 may include adjustable shutters 108 that control the emitted laser beam position. The laser beam may only be emitted at open portions of the rotating vertical laser 109 where shutters 108 are not present. By adjusting the shutters 108, the rotating vertical laser 109 will only emit the laser beam at specific ranges of angles. These ranges of angles can correspond to the location(s) of the laser receiver(s) on the alignment template. For example, the shutters can be adjusted so the vertical rotating laser is visible to a laser receiver on an alignment template, a laser receiver on a bottom of piling and a laser receiver on a top of a piling. By monitoring or checking the vertical alignment, an operator can verify that the pilings are being accurately positioned.

Figure 2:
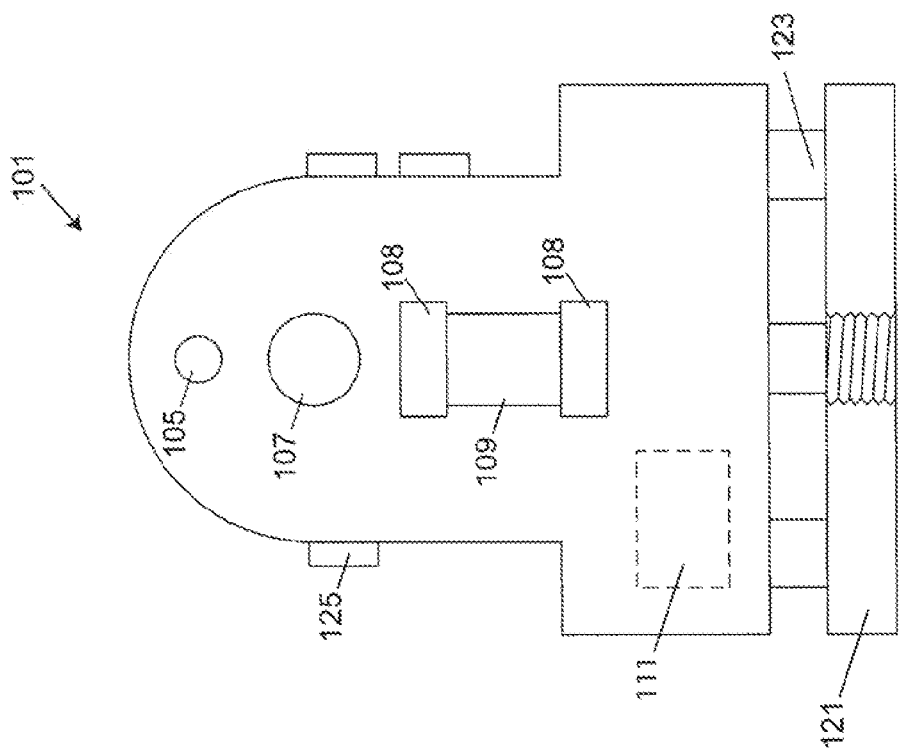

Another embodiment of a true sight laser assembly 131 is illustrated in FIG. 2. This embodiment includes all of the same features as the true sight laser assembly 101 as illustrated in FIG. 1. However, the vertical rotating laser 109 is offset to one side of the true sight laser assembly 131 so the vertical rotating laser 109 is not in the same plane as the laser 105. This offset allows the vertical rotating laser 109 to emit a rotating laser beam that is offset from the center line of the pilings. Thus, laser beam emitted by the vertical rotating laser 109 is offset from the pilings but can still be used by the inventive system for performing the alignment. The beam from the rotating vertical laser 109 is detected by laser receivers. In this embodiment, the laser receiver(s) can be offset by the same distance that the vertical rotating laser 109 is from the piling that it is mounted on.

In an embodiment, the rotating vertical laser 109 can also have shutters 108 so the laser can be emitted only at the desired location(s). For example, the shutters 108 can be adjusted so the laser beam may be projected 10', 100' or any other distance. In a preferred embodiment, the laser beam is only directed in the direction(s) that the beam is needed. The shutters 108 can also make the vertical laser beam more powerful, giving the illusion of a solid line. The rotating vertical laser 109 can be precision calibrated to ensure that it is a vertical plumb line and that the vertical laser 109 is in line with the horizontal laser 105. The sight scope 107 can enable the operator to see and adjust the beam from the horizontal laser 105 to the desired location. The sight scope 107 can have cross hairs for alignment. The horizontal laser can be mounted and calibrated to the cross hairs of the sight scope. In an embodiment, the horizontal laser can be set to approximately 3.5 inches above the pile.

The sight scope 107, horizontal laser 105 and vertical laser 109 components can all work together as a single unit. The true sight laser assembly 101, 131 can also include a battery pack 111 that can be at the bottom portion of the true sight laser unit 101, 131 and can be rechargeable. In an embodiment, the battery pack 111 can hold a 10 hour charge. The battery pack 111 may also have an adapter that can enable the true sight laser assembly 101, 131 to run off of a car battery or other electrical power source on the job site. In other embodiments, the true sight laser assembly 101, 131 can have a remote control which could allow the ABI hammer operator to turn on the laser beam only when the laser is needed. This feature would extend the operating time of the battery 111 as well as the life of the lasers 105, 109.

Figure 5:
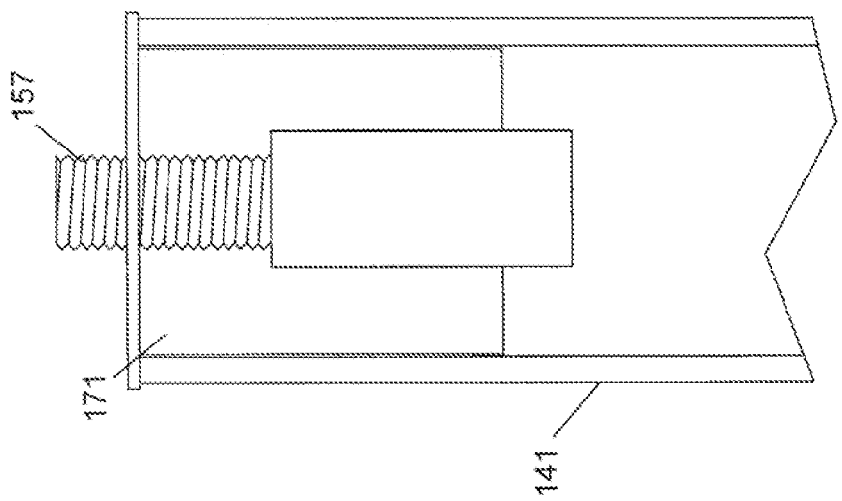
FIGS. 3-5 illustrate embodiments of mounting brackets for securing equipment to pilings.
Figure 4:
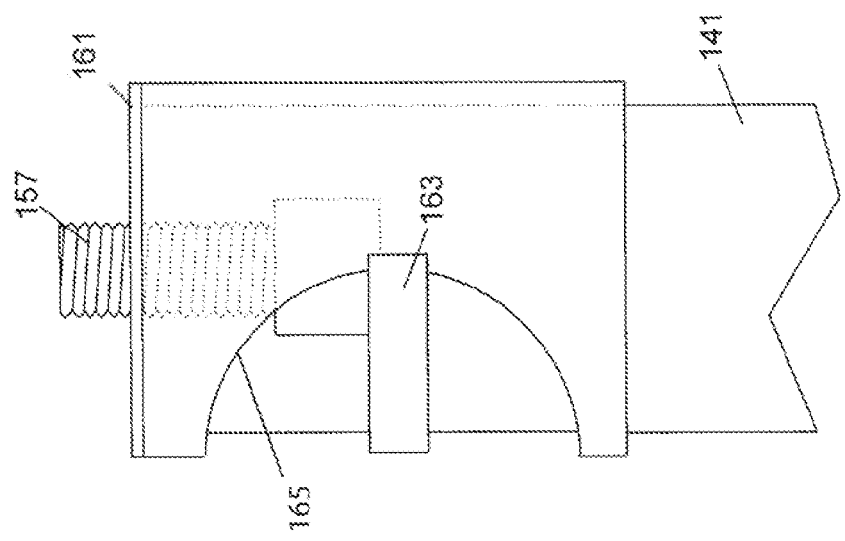
Figure 3:
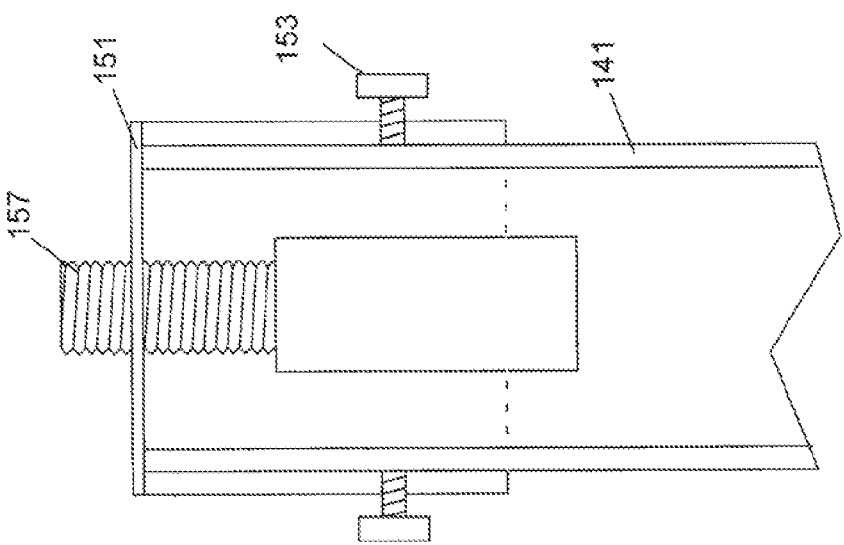

Rather than mounting a laser to a tripod, the true sight laser assembly 101, 131 and other system equipment can be mounted directly to the top of the pile. With reference to FIGS. 3-5, three embodiments of the pile mounting bracket are illustrated. Each of these mounting brackets will have the same universal mounted bracket found on all building instruments. For round pipe piles the brackets can have a slightly larger inner diameter round pipe (sleeve) that can be installed directly over the pile. With reference to FIG. 3, a cross section view of a mounting bracket 151 on a piling 141 is illustrated. The bracket 151 fits over the piling 141 and can include a plurality of screws 153 or other devices that can secure and align the mounting bracket 151 to the piling 141. The bracket 151 can also include a mounting screw 157 that can engage threads in the base plate of the true sight laser assembly 101, 131 to secure this unit to the bracket 151. With reference to FIG. 4, another embodiment of the bracket 161 is illustrated which also fits over the piling 141. The bracket 161 can have an opening 165 that allows access to the mounting screw 157. A quick clamping mechanism 163 is attached to the bracket 161 over the opening 165 to secure the bracket 161 to the pile 141.

In alternative embodiments, as illustrated in FIG. 5, a bracket can have an outer diameter pipe that can be inserted into the inner diameter of the piling 141. In a preferred embodiment, the outer diameter of the bracket 171 can be a close fit to the inner diameter of the piling 141 so that the true sight laser assembly 101, 131 can be held in alignment without having to make adjustments to fasteners. Although the brackets 151, 161, 171 have been illustrated with round pipe pilings, similar brackets can be used with other non-circular cross section pilings such as I-Beams or any other cross section pilings. In these embodiments, the brackets would be mounted around or within portions of the piling cross section and secured to the piling in manners similar to brackets 151, 161, 171. Each bracket will keep the lasers of the true sight laser assembly 101, 131 properly aligned on the piling 141.

In an embodiment, as discussed above, it can be useful to have the true sight laser assembly and laser targets offset from the center line of the pilings. With reference to FIG. 6, an offset bracket 471 used with a handheld target 421 is shown and in FIG. 7, an offset bracket 471 used with a true sight laser assembly 101 is shown. The brackets 471 can include a cap section 425 that is placed over the tops of the pilings 141 and offset plates 475 that are secured to the cap sections 425 with a fastener 479. A quick clamping mechanism 163 can be attached to the bracket 161 over the opening 165 to secure the cap sections 425 of the offset brackets 471 to the piles 141. The true sight laser assembly 101 and handheld target 421 are mounted at equal distances off the centerline of the pilings 141. This configuration allows the laser light to be transmitted around any adjacent pilings 141. Thus, if there are any pilings between the true sight laser assembly 101 and handheld target 421 these pilings 141 will not interfere with the alignment detection process. In contrast, if the true sight laser assembly 101 is aligned with the piling, the beam of the rotating vertical or the horizontal laser may be in line with the row of pilings and the laser beams only be used to determine the alignment of an adjacent piling.

With reference to FIGS. 8 and 9, another component of the inventive system for installing pilings is the adjustable guide template 201. FIG. 8 illustrates a top view of the adjustable guide template 201 and FIG. 9 illustrates a side view of the adjustable guide template 201 between two adjacent pilings 141. The adjustable guide template 201 can also have an adjustable pivot point 211 at one portion and a stand structure 214 on the opposite portion so the structure can be supported above uneven terrain, water and snow. The adjustable guide template 201 can also include wheel 237 and handles 217 that are coupled to the guide template 201 with posts 216. A user can move the guide template 201 into the proper position using the handles 217. In an embodiment, the guide template 201 can include a level 213 that indicates when the structure is level to ensure proper pile to pile spacing. The level 213 can be a magnetic torpedo level that's mounted on the adjustable guide template 201. The adjustable guide template 201 can also include a mounting bracket 215 for a laser receiver or white board target that can be used for alignment.

The adjustable guide template 201 can include telescoping tubular structure 203 that is adjustable in length. The adjustable guide template 201 can be circular or square cross section tubing. In an embodiment, the tubular structure 203 can have approximately a 1¼ inch inner diameter (I.D.) to a 1¼ inch outer diameter (O.D.). The adjustable guide template 201 may be adjustable between 9 feet and 18 feet in length or a longer/shorter length, depending upon the required distance between pilings. The telescoping tubular structure 203 can also include a length locking mechanism. For example, the telescoping tubular structure 203 can have a series of holes 205 that extend along the length of the guide template 201. When the telescoping portions can be adjusted to a desired length and a locking pin 207 can be placed through the aligned holes 205 to lock the telescoping tubular structure 203 to the approximate desired length. The series of holes may be spaced every 6" so that the length is not precisely adjusted.

A fine length adjustment mechanism can be placed at one or both ends of the telescoping tubular structure 203. In an embodiment, the fine length adjustment mechanism can be a threaded end fitting 209 that can be rotated axially relative to the telescoping tubular structure 203 to accurately adjust the length of the adjustable guide template 201. For example, the threaded mechanism can include a ¾" coarse female fitting at the end(s) of the telescoping tubular structure 203 and the end fittings 209 can have a ¾"×10" threaded rod and a portion that fits around a portion of the piling design 141 being used for the solar panel array. In an embodiment, the end fittings 209 can be changed to accommodate pilings having different cross sections and dimensions.

With reference to FIGS. 10 and 11, in another embodiment, the adjustable guide template 221 can be adjustable in both length and height. Rather than being a straight structure, the telescoping tubular structure 223 can include both horizontal sections 231 and vertical sections 233 that are adjustable in length. In an embodiment, the length of the adjustable guide template 221 can range from 9 to 18 feet and the height can range from about 2 to 4 feet. The length and height of the telescoping tubular structure 223 can be adjusted and locked to the desired dimensions with pin 207 and hole 205 locking mechanisms and the threaded rods of the end fittings described above or any other similar length adjusting mechanism.

The raised center of the adjustable guide template 221 allows a user to more easily move the structure. In order to assist the user, the adjustable guide template 221 can be supported by a pivot point 211 and a wheel 237. Handles 217 can allow the user to rotate the adjustable guide template 221 about the pivot point 211 as illustrated in FIG. 8 into proper alignment. A laser receiver can be mounted on the mounting bracket 215 and the user can visually determine when the adjustable guide template 221 is properly aligned with the rotating vertical laser of the true site laser assembly. When the adjustable guide template 221 is properly positioned, the adjacent piling 141 can be driven into the ground at the designated location.

The adjustable guide templates 201 and 221 illustrated in FIGS. 8-11 can have different types of end fittings 209. With reference to FIGS. 12-17, three examples of end fittings are illustrated. FIG. 12 illustrates a top view of an end fitting 259 used with a circular pipe piling. The end fitting 259 can have a semi-circular portion 261 and a threaded portion 263 that can be secured to the adjustable guide templates. The inner diameter of the semi-circular portion 261 can be a very close fit to the outer diameter of the piling which may have an outer diameter of 4 inches, 6 inches or any other suitable diameter. FIG. 13 illustrates a side view of the end fitting 259 used with a circular pipe piling.

FIG. 14 illustrates a top view and FIG. 15 illustrates a side view of an end fitting 269 used with an I-Beam or rectangular cross section piling. The end fitting 269 can have a "U" shaped portion 271 that fits closely around three sides of the I beam or rectangular cross section piling and a threaded portion 263, such as a 6 inch cross section I-Beam. However, in some embodiments, it may be desirable to have a looser fit with the piling. For example, if there is any rotational misalignment with the piling, a tight fitting end fitting 269 will cause the adjustable guide template to also be out of alignment. In an embodiment, the connection between the "U" shaped portion 271 and the threaded portion 263 may not be rigid and may allow some movement so that the alignment of the adjustable guide template can be properly aligned.

In some solar panel arrays, a piling may not be required for each space in a row. Thus, rather than installing a piling, the user can simply mark the point where a piling is not going to be installed and move on to the next piling location. FIG. 16 illustrates a top view and FIG. 17 illustrates a side view of a location marking end fitting 279 that includes a marker point 283 that is connected to a ring 383 by a plurality of spokes 285. When using the location marking end fitting 279, the adjustable guide templates is aligned with the prior piling and the user can press the marker point 283 into the ground to mark the location. The user can then use this point as a reference mark for the next piling location. It is also possible that a mix of different types of pilings can be used in the same array. The ground mark can be used as the location for installing another piling structure, as well as for predrilling.

Figure 20:
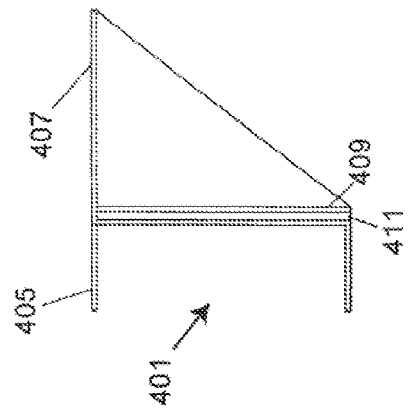
FIGS. 18-20 illustrate an embodiment of a hammer target.
Figure 18:
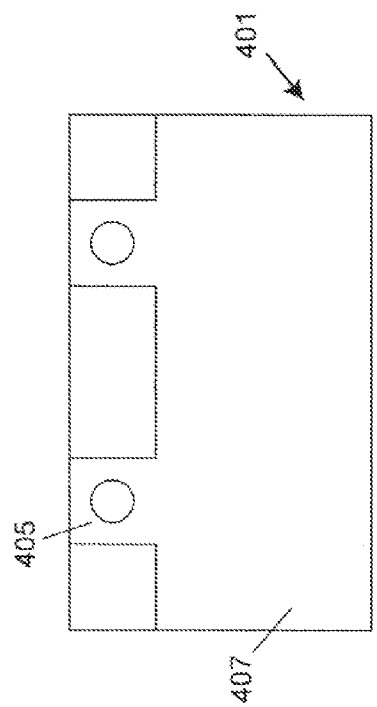
Figure 19:
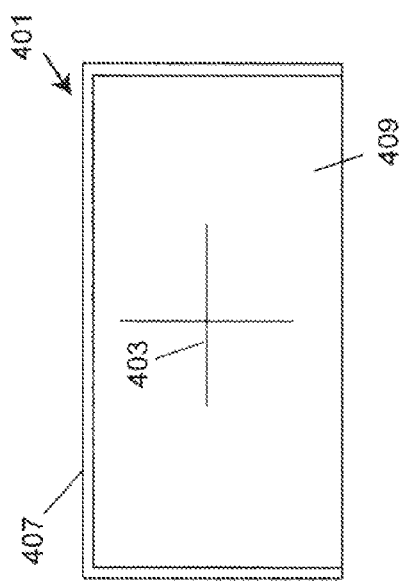

When the piling location is determined, a pile driver is used to insert the pile into the ground. The true sight laser assembly is mounted on the adjacent piling. With reference to FIGS. 18-20, an embodiment of a hammer target 401 is illustrated. In order to detect the horizontal position of the pile being installed, a target 401 can be attached to the hammer of the pile driver. As the pile is driven into the ground, the horizontal laser of the true sight laser assembly is directed towards what will be the upper end of the piling being driven into the ground. The horizontal laser will be visible on the target 401 as the piling is driven into the soil close to the installation height. In an embodiment, the target 401 will have cross hairs 403 or a bull's eye marking which indicates the aligned position of the piling. It can be difficult to control the horizontal alignment of the piling during the driving process. However, the hammer force can be stopped when the horizontal laser is vertically aligned with the target 401.

FIG. 18 illustrates a top view of the hammer target 401 which shows a mounting bracket 405 for attaching the target 401 to the hammer and a shade portion 407 for protecting the cross hairs of the target 401 from being exposed to sun to improve the visibility of the horizontal laser on the target 401. FIG. 19 illustrates a front view showing the cross hairs 403 on a white board 409. FIG. 20 shows a cross section of the hammer target 401 which can include a ¾ inch thick plywood layer 411 and a whiteboard 409 that has the cross hairs 403. In an embodiment, the hammer target can be 401 can include an 8 inch×16 inch target that's made out of white board. In other embodiments, the target 401 can be any other shape and any other suitable marking can be placed on the target 401 for showing the horizontal laser. For example, the bull's eye 403 can be mounted on a sticker that can be attached to the target 401. In other embodiments, Velcro, glue, screws, fasteners or any other suitable mechanism can be used to attach the white board 409 to the target 401. The hammer target 401 can be mounted to the side of the clamping jaws of the pile driver. Mounted to the bracket will be ¾" plywood to make up the center frame. We can then screw an interchangeable white board target as needed. It will also have a shading hood for easy visibility of the laser during sunny periods.

In yet another embodiment, the hammer of the pile driver can include an integrated target. For example, the target portion of the hammer can be painted with a target or a target can be attached to the hammer. Alternatively, white squares could be painted on the jaws of the hammer. However, the target area of the hammer may not be flat making the laser on the target difficult to see. It can also be hard to keep the hammer clean during operation and after making multiple marks, the integrated hammer target may not be as accurate as using a separate hammer target device.

Figure 22:
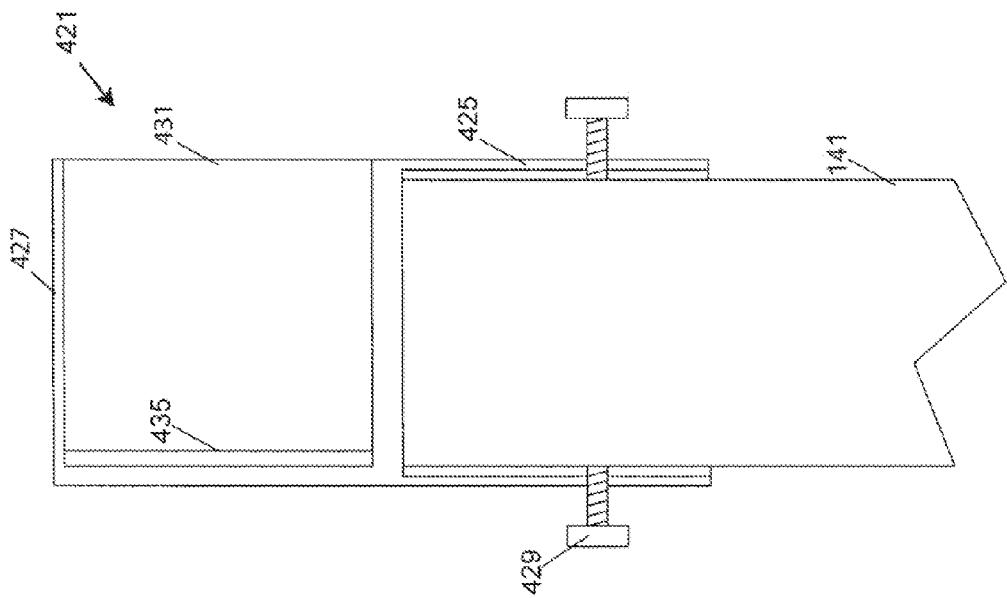
FIGS. 21-24 illustrate an embodiment of a handheld target.
Figure 21:
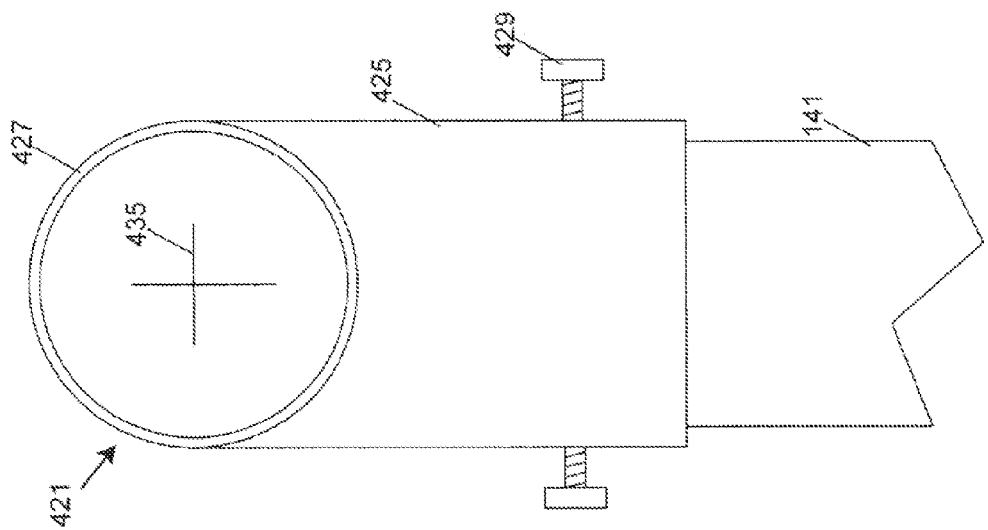

With reference to FIGS. 21 and 22, after the piling has been driven into the ground, a hand held target 421 can be placed on the piling 141 for a final alignment check. The handheld target 421 can include a cap section 425 and a target section 427. The cap section 425 can have a close fit with the top of the piling 141 and may include an adjustment mechanism to adjust the fit. In this example, screws 429 are used as the adjustment mechanism. The target section 427 can include a tube creating a recessed volume 431 that blocks sunlight and a target 435 such as a white board having cross hairs, a bull's eye or other target pattern located within the recessed volume 431. In an embodiment, the target section 427 can include a 4 inch diameter cylinder. The handheld target 421 is placed on the piling and if the piling is in proper alignment, the horizontal laser should be aligned with the target 435. If there is an alignment error, the piling can be adjusted. The pile driver can be used to further insert the piling 141 into the ground or pull the piling 141 up to the proper height. Because the handheld target 421 is carried by an operator, it can be made of light weight material and have a belt clip for easy transportation and access.

Figure 24:
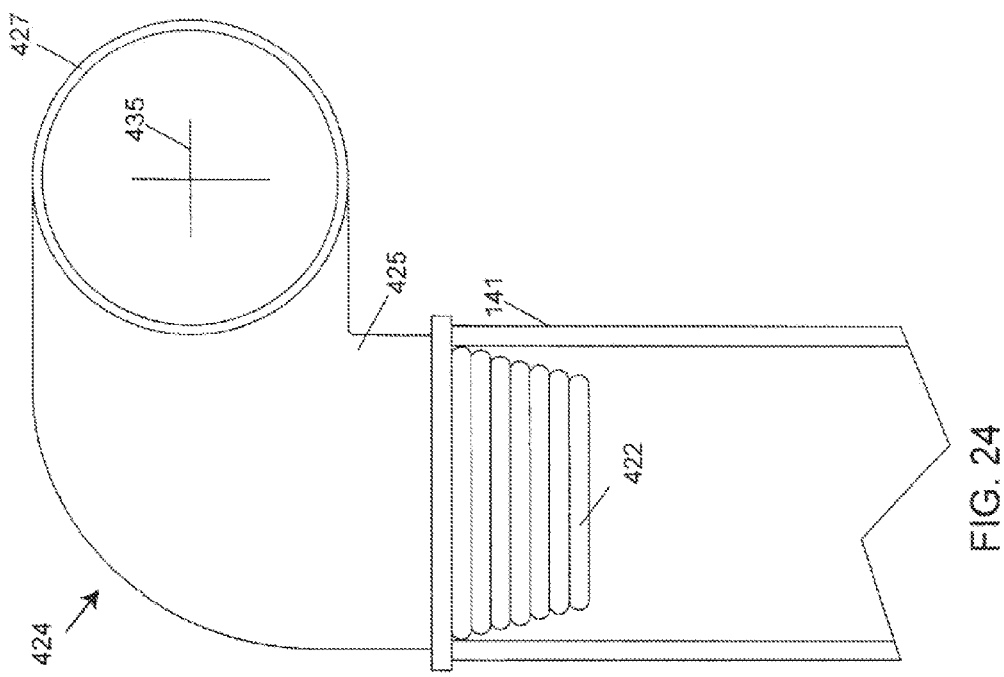
Figure 23:
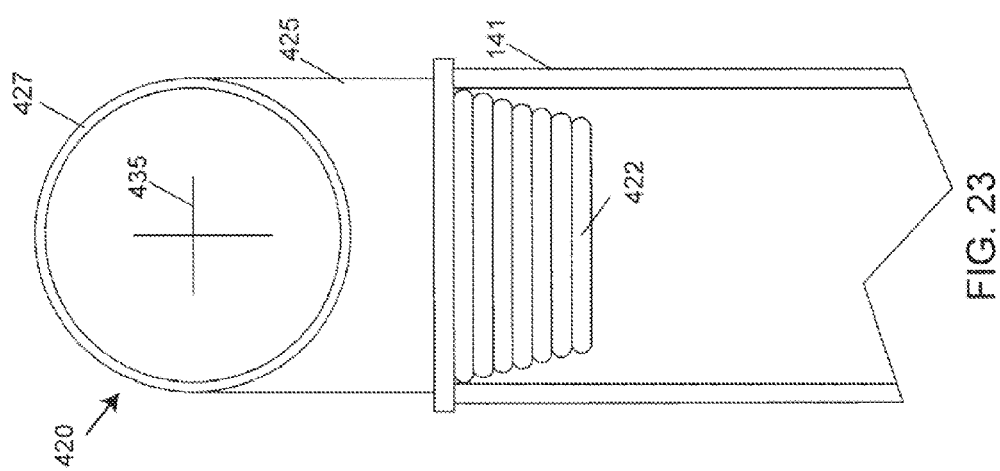

In other embodiments, the hand held target can have a different design and construction. With reference to FIG. 23, the hand held target 420 may have a ribbed insertion portion 422 that fits within the piling 141. The ribbed insertion portion 422 can include a plurality of ribs that are arranged in a tapered manner and can be made of a flexible material. With reference to FIG. 24, the hand held target can have an offset design that places the target section 427 out of alignment with the piling 141. In this configuration, the horizontal laser can be parallel but offset from the pilings 141 as shown in FIG. 7. The hand held target embodiments shown in FIGS. 21-24 can be made of plastic, metal or any other suitable material.

Figure 27:
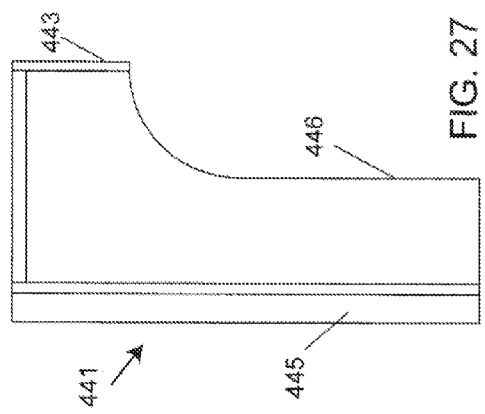
FIGS. 25-28 illustrate an embodiment of an alignment bracket.
Figure 28:
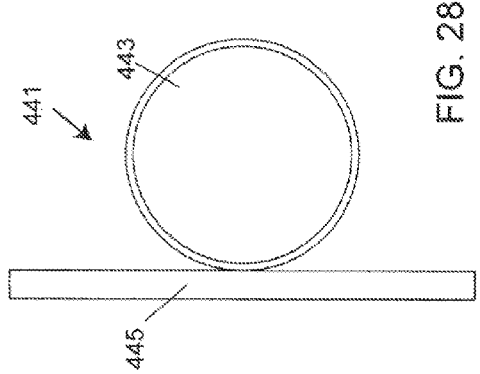
Figure 25:
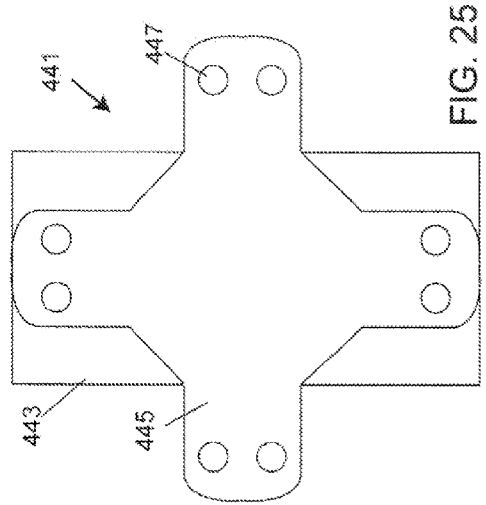
Figure 26:
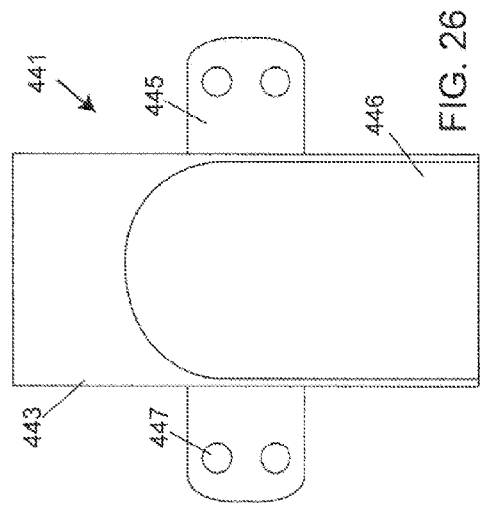

With reference to FIGS. 25-28, an embodiment of an alignment bracket 441 is illustrated. If there are horizontal alignment errors, an alignment bracket 441 can be used to adjust the piling horizontally. The illustrated embodiment of the alignment bracket 441 can include a mounting plate 445 that can be attached to the ABI hammer and a cap section 443 that can be placed over the piling. In this example, the cap section 443 is a circular pipe used for a round cross section pipe piling. In other embodiments, a cap section 443 that corresponds to any other piling cross section shape can be used. FIG. 25 shows a back view of the bracket 441 and mounting plate 445 that includes holes 447 for securing the alignment bracket 441 to the hammer. FIG. 26 shows a front view of the alignment bracket 441 that shows the open lower portion 446 and the enclosed upper portion of the cap section 443. FIG. 27 shows a side view cross section of the alignment bracket 441 and FIG. 28 shows a top view of the alignment bracket. The alignment bracket 441 is illustrated as having a circular cap section 443 which can have a 4 inch, 6 inch or any other diameter. In other embodiments, the cap section 443 can have a rectangular cross section suitable for I-beams or any other types of pilings.

In some cases, the pile can contact a subterranean rock or hard soil that can cause the piling to deflect horizontally. When the direction and magnitude of the alignment error is determined, the alignment bracket 441 can be placed on the piling with the mounting plate 445 substantially perpendicular to direction that the piling needs to be moved. The mounting plate 445 can be attached to an ABI hammer that can move the alignment bracket 441 in the direction to correct the piling alignment. Once the piling has been adjusted, the handheld target can be placed on the piling again for a final position check. If necessary, the described process can be repeated.

Figure 29:
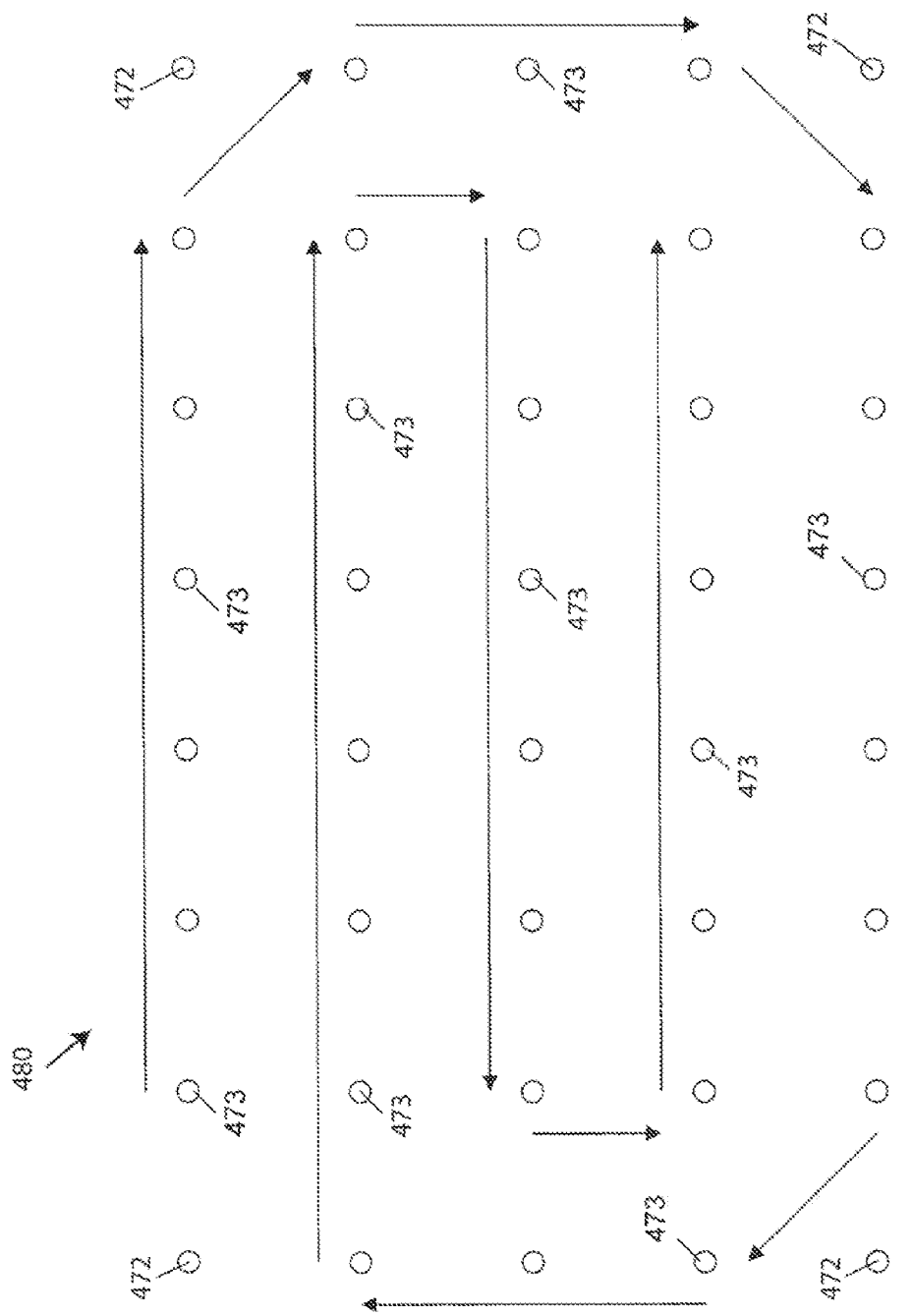
FIG. 29 illustrates an embodiment of a sequence of piling installations in an array.

With reference to FIG. 29, a simplified layout of a solar panel piling array 480 installation sequence is illustrated. In this example, the array 480 can have a rectangular shape and the corner pilings 472 can be located by a surveyor other positioning method. The inventive system can be used to first locate and install pilings 473 between the set corner pilings 472. In this example, the pilings 473 on the perimeter of the array are set first. The system can then be used to install the pilings 473 in the interior of the array 480. After an interior row of pilings 473 is installed, the system can install the next row of pilings 473 until the solar panel piling array 479 is completed. By performing the described process, pilings in a 1,000+ piling array have been installed with an accuracy of ¼ inch of side to side alignment and within ¼ inch of the designated height.

Figure 30:
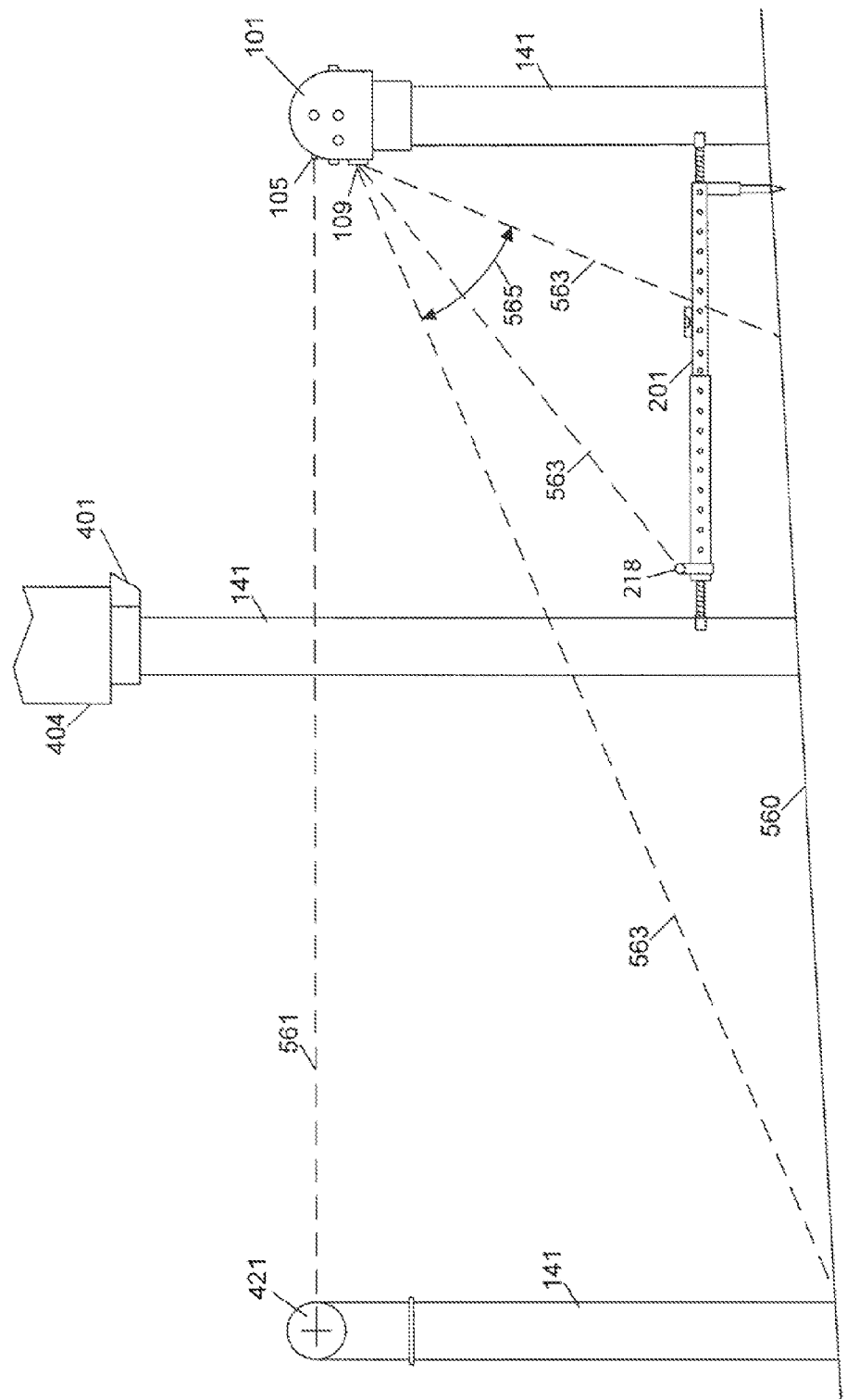
FIG. 30 illustrates a side view of a piling being driven into the ground.

With reference to FIG. 30, in an embodiment, the process for installing the pilings is performed by mounting the true sight laser assembly 101 on a pile 141. The position of the true sight laser 101 can have adjustments and can be placed along the center line of the pile 141 or can be offset as needed. The handheld target 421 can be placed at the other end of the row of piles 141 that will be the same height off the top of the pile 141 as the true sight laser. The laser operator can then look through the sight scope and adjust the horizontal laser beam 561 to the bull's eye on the handheld target 421 at the other end of the row. With the horizontal laser aligned with the bull's eye, the rotating vertical laser beam 563 may automatically be in line with the horizontal laser beam 561. In this illustration, the pilings 141 are mounted on a sloped surface 560.

After the true sight laser assembly 101 is secured to the piling 141 and the lasers 561, 563 are aligned, the handheld target 421 can be removed from the piling 141 at the end of the row. The alignment template 201 can be used to position the next piling 141 in the row of pilings 141. A bull's eye mark or a bull's eye sticker can be on the target board and the hammer target 401 can be mounted to the hammer 404. At this point, the pile driver such as an ABI hammer 404 can be used to drive the pile 141 into the ground 560. The pile driver 404 can start with a first row of piles going off of the four survey corner points to complete the solar array grid which can include about 1,000 pile insertion points. With no pile insertion points between any two piles, an installer can make the proper calculation for the correct distance between adjacent pilings. An adjustable alignment template 201 can be adjusted to the calculated length. The alignment template 201 can be placed against the set piling 141 and the installer can move the alignment template 201 into alignment with the rotating vertical laser beam 563 which can be adjusted to only exit the true sight laser assembly 101 within a limited angle range 565 by adjusting the shutters. The alignment template 201 can have a laser receiver 218 to detect the vertical laser beam 563. Based upon the laser receiver 218 reading, the installer can aligning template 201 and identify the correct starting position to drive the piling 141. A bobcat or ABI operator can then put the pile 141 into the correct location. During the pile driving process, the operator can also monitor the horizontal laser beam 561 intersection with the hammer target 401 that will be visible to the naked eye. If properly installed, the horizontal laser 561 will be visible at the center of the hammer target at the finished pile position. The hammer target 401 and horizontal laser 561 allows the operator to be precise in the execution of pile driving. Since the ABI operator can be able to see the hammer target 401, adjustments can be made while driving the pile 141.

In contrast to the prior art method for pile driving, a ground operator no longer has to be in a hazardous location or have to hold the receiver and directing the ABI operator to move the pile up and down. In the prior art methods, the operator also had no way of telling if the pile was in line and parallel with the other piles. The inventive process can be up to 10 times faster than prior art pile driving methods.

Figure 31:
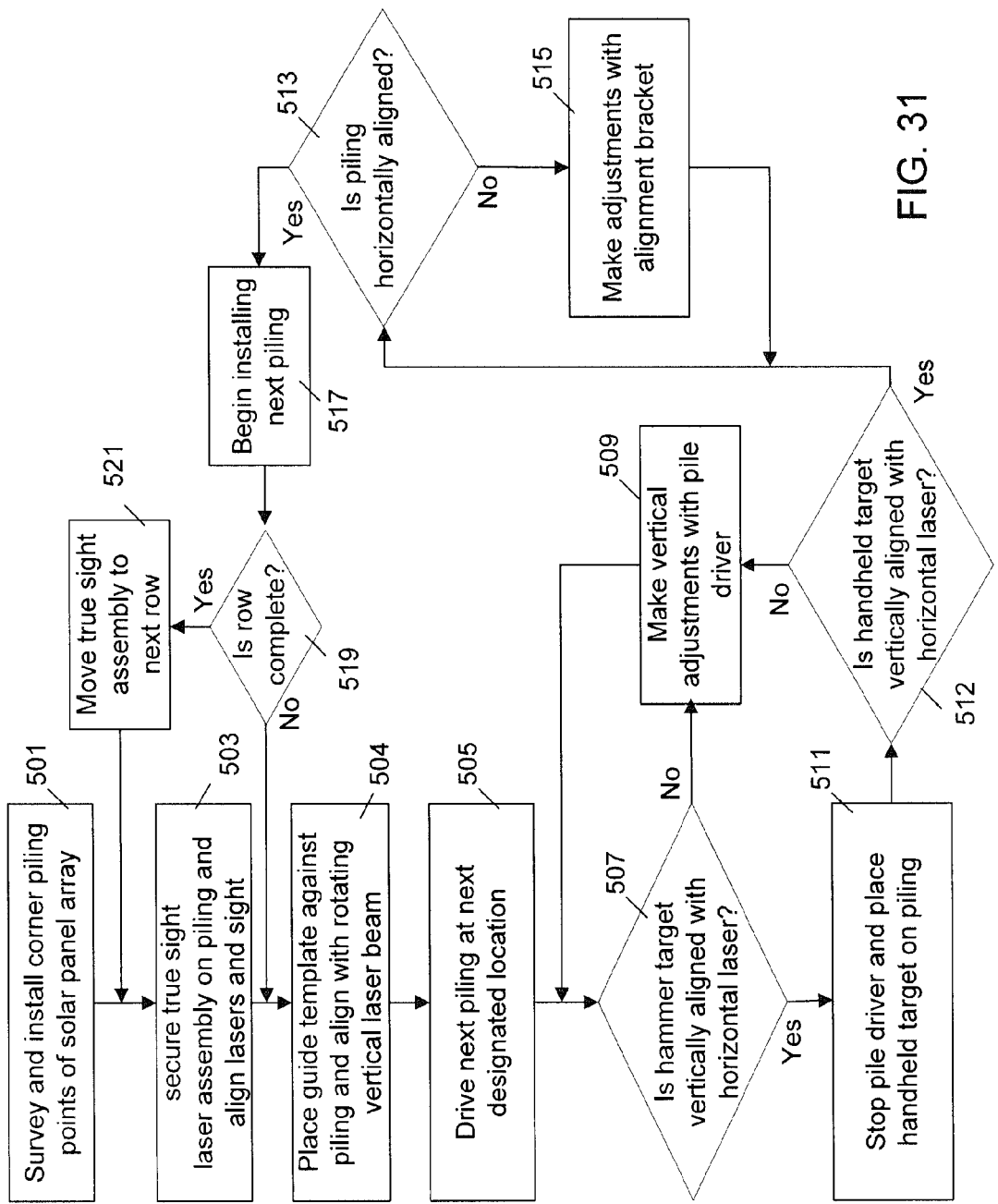
FIG. 31 illustrates a flow chart for installing pilings.

FIG. 31 illustrates a flowchart describing an embodiment of a solar panel array piling installation process. The four corners of the array can be surveyed and the corner pilings can be installed at the surveyed locations (block 501). The true sight laser assembly can be secured to one of corner pilings with the lasers aligned with another corner piling (block 503. The alignment guide template can be placed against the corner piling and aligned with the rotating vertical laser of the true sight laser assembly (block 504. The guide template can then be used to locate the position of the next piling and the next pile can be driven in at the designated location (block 505). The horizontal laser will appear on the hammer target and the operators will check for vertical alignment with the target (block 507). If the pile is not vertically aligned with the target, the pile driver can make vertical adjustments by further inserting or pulling the piling up (block 509).

Once the vertical alignment is good, the pile driver is stopped and a handheld target is placed on the piling (block 511). The operators can check the vertical alignment of the horizontal laser on the handheld target (block 512). If the horizontal laser is not vertically aligned, the pile driver can be used to make vertical adjustments to the pile (block 509). If the pile is vertically aligned, the horizontal alignment of the piling can be checked (block 513). If the horizontal alignment is off, the alignment bracket can be placed on the piling and the required horizontal adjustments can be made (block 515). If the horizontal alignment is accurate, the operators can move on to begin installing the next piling (block 517). This process will continue until the installation of the row of pilings has been completed (block 519). If the row is complete, the true sight assembly is moved to the next row of pilings (block 521). The true sight assembly is attached to the first piling of the next row and the process continues until the array of pilings is completely installed.

Yet another embodiment, the horizontal laser can be attached to a piling at one end of the row and a vertical rotating laser can be attached to the piling at the opposite end of the row. Using the same described process, the guide template can be placed against a set piling and aligned with the vertical laser to indicate the position of the next piling. The pile driver can insert the next pile into the surface until the horizontal laser is aligned with the hammer target. The hand held target can be used to check the alignment of the piling and the adjustment bracket can be used to make horizontal adjustments.

An improvement of the inventive system is the elimination of almost all of the survey points and guard plates in a large mega watt sized solar array. This will result in a saving of a survey crew of two men, four man plate lay-out crew and aligning crew. A typical solar panel array can have between 980 and 1,250 pilings. An example of a solar panel array can have 1,000 piles. Using the prior art survey method, a survey crew in 2011 may cost about $6,000 per mega watt, $10,000 for plate layout, and $5,000 for an aligning crew. As well as the overhead cost of the plates at $38.00 each, stakes, hotels, per diem, trucks, airline tickets. This technology would eliminate 95% of survey points and 100% of plates. This will result in a savings of over $25,000 per Mega Watt. The United States installed about 1 giga watt of solar panel arrays (1,000 mega watts) in 2010 and is expected to build 2 giga watts in 2011 and another 15 giga watts by 2015. The inventive process could save about $25 million per giga watt.

The present disclosure, in various embodiments, includes components, methods, processes, systems and/or apparatus substantially as depicted and described herein, including various embodiments, subcombinations, and subsets thereof. Those of skill in the art will understand how to make and use the present disclosure after understanding the present disclosure. The present disclosure, in various embodiments, includes providing devices and processes in the absence of items not depicted and/or described herein or in various embodiments hereof, including in the absence of such items as may have been used in previous devices or processes, e.g., for improving performance, achieving ease and/or reducing cost of implementation. Rather, as the flowing claims reflect, inventive aspects lie in less than all features of any single foregoing disclosed embodiment.

What is claimed is:

1. A method for installing pilings, the method comprising:
installing a first corner piling at a first corner installation site of a planned array of pilings;
installing a second corner piling at a second corner installation site of the planned array of pilings;
securing a laser assembly to the first corner piling;
emitting a first laser and a second laser from the laser assembly, the first laser having a vertically oriented range spanning a segment of a vertical plane, the second laser having a horizontal orientation;
using the first laser to identify intervening installation sites spaced apart along a line between the first corner piling and the second corner piling;
installing intervening pilings at the intervening installation sites, respectively, including using the second laser to monitor vertical positioning of the intervening pilings during their respective installations; and
connecting solar panels to the intervening pilings, respectively.

2. The method of claim 1 wherein installing the intervening pilings includes:
placing a first end of a guide template against the first corner piling;
using the first laser to align the guide template;
using the guide template to identify a first intervening installation site; and
driving a first intervening piling into a surface at the first installation site while using the second laser to monitor vertical positioning of the first intervening piling.

3. The method of claim 2 further comprising using the second laser to measure an alignment of an upper portion of the first intervening piling after driving the first intervening piling into the surface.

4. The method of claim 3 wherein using the second laser to measure the alignment of the upper portion of the first intervening piling includes using a handheld laser receiver in conjunction with the second laser to measure the alignment of the upper portion of the first intervening piling.

5. The method of claim 2 further comprising:
using the second laser to determine that anthe upper portion of the first intervening piling is out of alignment after driving the first intervening piling into the surface; and
applying a force to the first intervening piling to bring the upper portion of the first intervening piling into alignment.

6. The method of claim 5 wherein applying the force to the first intervening piling includes applying the force to the first intervening piling via an alignment bracket detachably connected to the upper portion of the first intervening piling.

7. The method of claim 6 further comprising using the alignment bracket in conjunction with the second laser to determine that the upper portion of the first intervening piling is in alignment after applying the force to the first intervening piling.

8. The method of claim 2 further comprising adjusting a length of the guide template so that the length of the guide template corresponds to a predetermined spacing between the intervening pilings.

9. The method of claim 8 wherein adjusting the length of the guide template includes performing a coarse adjustment of the length of the guide template and performing a separate fine adjustment of the length of the guide template.

10. The method of claim 2 wherein:
using the first vertical laser to align the guide template includes using the first laser to align the guide template before driving the first intervening piling into the surface; and
the method further comprises—
placing the first end of the guide template against the first intervening piling after driving the first intervening piling into the surface,
using the first laser to align the guide template after driving the first intervening piling into the surface,
using the guide template to identify a second intervening installation site, and
driving a second intervening piling into the surface at the second intervening installation site while using the second laser to monitor vertical positioning of the second intervening piling.

11. The method of claim 10 further comprising:
installing additional intervening pilings so as to complete installation of a row of the planned array of pilings; and
securing the laser assembly to the first intervening piling, the second intervening piling, or one of the additional intervening pilings after installing the additional intervening pilings.

12. The method of claim 10 wherein using the second laser to monitor vertical positioning of the second intervening piling includes using the second laser to monitor the vertical positioning of the second intervening piling while the second laser is spaced apart from and parallel to the line.

13. The method of claim 2 wherein using the rotating first laser to align the guide template includes using the first laser to align the guide template while the first laser is spaced apart from and parallel to the second laser.

14. The method of claim 2 wherein using the first laser to align the guide template includes using the first laser to align the guide template while the first laser is spaced apart from and parallel to the line.

15. The method of claim 2 wherein:
driving the first intervening piling into the surface includes driving the first intervening piling into the surface using a pile driver; and
using the second laser to monitor vertical positioning of the first intervening piling includes using the second laser in conjunction with a target detachably connected to the pile driver.

16. The method of claim 2 further comprising leveling the guide template before using the guide template to identify the first intervening installation site.

17. A method for installing pilings, the method comprising:
securing a laser assembly to a first piling, the laser assembly being configured to generate a horizontal laser and a rotating vertical laser;
placing a first end of a guide template against the first piling;
using the rotating vertical laser to align the guide template;
using the guide template to identify a location for a second piling of a planned array of pilings, the location for the second piling neighboring the first piling and being along a line between the first piling and a third piling within a row of the planned array of pilings;
driving the second piling into a surface at the identified location for the second piling before driving the second piling into the surface and while using the horizontal laser to monitor a vertical position of the second piling;
placing the first end of the guide template against the second piling after driving the second piling into the surface;
using the rotating vertical laser to align the guide template after driving the second piling into the surface;
using the guide template to identify a location for a fourth piling of the planned array of pilings, the location for the fourth piling being along a line between the second piling and the third piling;
driving the fourth piling into the surface at the identified location for the fourth piling while using the horizontal laser to monitor a vertical position of the fourth piling;
installing all remaining pilings in the row after driving the fourth piling into the surface; and
securing the laser assembly to a piling within the row that is not a corner piling of the planned array of pilings after installing all remaining pilings in the row.

18. The method of claim 17 wherein using the rotating vertical laser to align the guide template includes using the rotating vertical laser to align the guide template while the rotating vertical laser is spaced apart from and parallel to the horizontal laser.

19. The method of claim 17 wherein:
driving the second piling into the surface includes driving the second piling into the surface using a pile driver; and
using the horizontal laser to monitor vertical positioning of the second piling includes using the horizontal laser in conjunction with a target detachably connected to the pile driver.

20. The method of claim 17 further comprising leveling the guide template before using the guide template to identify the location for the second piling.

21. The method of claim 17 further comprising adjusting a length of the guide template so that the length of the guide template corresponds to a predetermined spacing between pilings within the row.

22. The method of claim 21 wherein adjusting the length of the guide template includes performing a coarse adjustment of the length of the guide template and performing a separate fine adjustment of the length of the guide template.

23. The method of claim 17 further comprising using the horizontal laser to measure an alignment of an upper portion of the second piling after driving the second piling into the surface.

24. The method of claim 23 wherein using the horizontal laser to measure the alignment of the upper portion of the second piling includes using a handheld laser receiver in conjunction with the horizontal laser to measure the alignment of the upper portion of the second piling.

25. The method of claim 17 further comprising:
   using the horizontal laser to determine that an upper portion of the second piling is out of alignment after driving the second piling into the surface; and
   applying a force to the second piling to bring the upper portion of the second piling into alignment.

26. The method of claim 25 wherein applying the force to the second piling includes applying the force to the second piling via an alignment bracket detachably connected to the upper portion of the second piling.

27. The method of claim 26 further comprising using the alignment bracket in conjunction with the horizontal laser to determine that the upper portion of the second piling is in alignment after applying the force to the second piling.

\* \* \* \* \*